United States Patent [19]

Kwak et al.

[11] Patent Number: 5,362,789
[45] Date of Patent: Nov. 8, 1994

[54] CROSSLINKED TERPOLYMERS OF HIGH SALT TOLERANCE

[75] Inventors: Yoon T. Kwak, Wayne; Stephen L. Kopolow, Plainsboro, both of N.J.

[73] Assignee: ISP Investments Inc., Wilmington, Del.

[21] Appl. No.: 171,147

[22] Filed: Dec. 21, 1993

[51] Int. Cl.$^5$ .................. C08K 3/00; C08F 222/04
[52] U.S. Cl. .................... 524/401; 526/271; 526/272
[58] Field of Search ................. 526/271, 272

[56] References Cited

U.S. PATENT DOCUMENTS

| 3,436,378 | 4/1969 | Azorlosa et al. | 260/78.5 |
| 3,697,618 | 10/1972 | Grunewalder et al. | 526/271 |
| 3,915,921 | 10/1975 | Schlatzer, Jr. | 526/271 |
| 5,082,913 | 1/1992 | Tazi et al. | 526/272 |

FOREIGN PATENT DOCUMENTS

| 0068847 | 1/1983 | European Pat. Off. | 526/271 |
| 0310079 | 4/1989 | European Pat. Off. | 526/272 |
| 4-126709 | 4/1992 | Japan | 526/272 |
| 2065676 | 7/1981 | United Kingdom | 526/272 |

Primary Examiner—Joseph L. Schofer
Assistant Examiner—N. Sarofim
Attorney, Agent, or Firm—Marilyn J. Maue; Joshua J. Ward

[57] ABSTRACT

This invention relates to a 1-8% crosslinked terpolymer of alkyl vinyl ether, maleic anhydride and a $C_{10}$ to $C_{20}$ alkyl (meth)acrylate in a critical molar ratio of from 1–3:1:0.01–0.08, which polymer has a pH of from about 4 to about 11, a Brookfield viscosity of from about 10,000 to about 150,000 cps and is characterized as having significantly improved salt tolerance and stability. The invention also relates to liquid or gel compositions of the crosslinked terpolymer containing a salt and a method for the preparation of said crosslinked terpolymer gel.

9 Claims, No Drawings

CROSSLINKED TERPOLYMERS OF HIGH SALT TOLERANCE

BACKGROUND OF THE INVENTION

Water-soluble polymeric dispersing and thickening agents of lower alkyl vinyl ether and maleic anhydride optionally including α-olefin monomer have been used in many latex and other formulations. However, high concentrations of these relatively low molecular weight polymers are required to provide improved results. In order to enhance their molecular weight and efficient use as thickeners, the polymers may be crosslinked with a polyfunctional compound, e.g. a $C_8$ to $C_{14}$ diene. It has been found that this innovation is not entirely satisfactory for, although crosslinking initially increases the viscosity, the salt tolerance of these crosslinked polymers is extremely low. Thus, upon addition to compositions containing a substantial amount of salt component, such as the ammonium and metal sulfates, citrates, chlorides, EDTA, etc. normally present in a concentration of about 1% in most cosmetic formulations, the polymer looses between 80 to 95% of its initial viscosity and fails to provide the desired thickening affect. Additionally, the salt containing polymeric compositions do not possess sufficient stability for storage and are subject to precipitation and phase separation. These affects are particularly troublesome when calcium or sodium chlorides are present in the composition.

Non-crosslinked alkyl vinyl ether, maleic anhydride and higher alkyl methacrylate terpolymers also have been employed as latex thickeners as shown in U.S. Pat. No. 3,436,378. However, these terpolymers are also subject to phase separation and, being of relatively low molecular weight and viscosity, do not provide a high degree of thickening. Additionally, these terpolymers do not form hydrogels.

Accordingly, it is an object of this invention to provide a crosslinked terpolymer hydrogel having high salt tolerance which retains up to 75% of its initial viscosity in salt containing compositions.

Another object of this invention is to provide a crosslinked terpolymer which is stable in compositions containing up to 1% salt.

Still another object is to provide a crosslinked terpolymer which is compatible with hard water and retains a viscosity of from about 20,000 to about 100,000 cps over extended periods of use or storage.

Yet another object is to provide a commercially feasible process for the preparation of a salt tolerant crosslinked terpolymer.

THE INVENTION

In accordance with this invention there is provided a terpolymer of $C_1$ to $C_4$ alkyl vinyl ether, maleic anhydride and a $C_{10}$ to $C_{20}$ alkyl (meth)acrylate in a critical mole ratio of about 1–3:1:0.01–0.08, which terpolymer is 1 to 8% crosslinked with a $C_6$ to $C_{14}$ terminally unsaturated diene. The crosslinked terpolymers of this invention are those having a Brookfield viscosity of from about 10,000 to about 150,000 cps. Most preferred of this group are those terpolymers containing a mole ratio of from about 2 to about 2.5 methyl vinyl ether, 1 maleic anhydride and between about 0.03 and about 0.07 lauryl methacrylate which is from 3 to 4% crosslinked and has a Brookfield viscosity of from about 20,000 to about 100,000 cps.

Suitable acrylate monomers employed in the formation of the present terpolymers include decyl, dodecyl, tetradecyl, hexadecyl, octadecyl and eiscoyl acrylates and methacrylates; although $C_{10}$ to $C_{14}$ alkyl methacrylates are preferred.

Among the agents used for crosslinking, including 1,5-hexadiene, 1,6-heptadiene, 1,7-octadiene, 1,9-decadiene, 1,10-undecadiene, 1,11-dodecadiene and 1,13-tetradecadiene, the $C_8$ and $C_{12}$ dienes are preferred.

The present crosslinked terpolymer is prepared under anhydrous conditions by free radical polymerization with carefully controlled feed ratios which simulate the critical ratio of monomers in the desired crosslinked terpolymeric product. The free radical initiator concentration is maintained throughout the reaction at a concentration of between about 0.05 and about 1.5 weight %, preferably between about 0.2 and about 0.4 weight %, based on total monomers. In general, any of the known free radical polymerization initiators are suitably employed in the present invention, although optimum results are achieved with organic peroxides; t-butylperoxy pivalate, lauryl peroxide, t-amylperoxy pivalate, 2,5-dimethyl-2,5-di(t-butylperoxy) hexane and mixtures thereof being most effective. The most preferred initiator for the purpose of the invention is found to be t-butylperoxy pivalate.

In carrying out the polymerization, the crosslinking agent is dissolved in an organic solvent which is a 60:40 to 40:60 molar mixture of cyclohexane and a lower alkyl acetate to form a solution containing from about 10 to about 40 weight % solids which is needed to maintain a liquid phase reaction. The crosslinking solution is charged to a nitrogen purged reactor and heated to a temperature of from about 50° to about 90° C., preferably from about 55° to about 65° C., before the addition of the vinyl ether, anhydride and acrylate monomers. Under constant agitation, the monomers of the terpolymer are then gradually introduced to the heated solution by means of separate feeds over a period of from about 1 to about 8 hours, more often from about 3 to about 5 hours, with intermittent introduction of initiator so as to maintain close control of the monomeric molar ratio within the above described ranges throughout the reaction and to provide a constant rate of reaction in the system. After completion of the polymerization, the product mixture is held at the reaction temperature for an additional period, e.g. from about 1 to about 3 hours before cooling to room temperature. The crosslinked terpolymeric product in the required critical ratio is precipitated and the crude product recovered by conventional means. For example, the crude product can be withdrawn from the reactor as a slurry which is then filtered from solution to form a wet cake, dried to a powder and recovered in between about 80 and about 95% yield.

Except for the critically of the monomeric proportions, many variations and alterations in the above procedure can be practiced without departing from the scope of the invention. For example, the addition of initiator can be monitored for constant incremental addition throughout the reaction. Also, it is desirable that the initiator be predissolved in one or both components of the solvent mixture before introduction into the reactor to assure more efficient contact of components. The individual monomers may also be predissolved in the solvent prior to entry into the reactor.

Suitable thickening gels of the neutralized products of this invention having superior salt tolerance can be prepared by mixing the product with an alcohol, acetone, water (to form a hydrogel) or another suitable dispersant to form a gel containing from about 0.5 to about 2.5 weight % solids. The gel is formed under vigorous agitation at room temperature or at an elevated temperature up to about 90° C. Organic and inorganic bases can be employed to provide a pH of between about 4 and about 11, preferably between about 5.5 and 8.

The gel product can be added to a standard formulation which requires thickening or emulsification and is particularly effective in cosmetic formulations containing ammonium and/or metal salt components. Although the amount of crosslinked terpolymer added to a formulation depends on the degree of thickening or emulsification desired, incorporation of from about 0.05 wt. % to about 2 wt. %, based on total formulation, is generally sufficient to achieve desired results.

Alternatively, the dry crosslinked terpolymeric powder can be added to an aqueous formulation, e.g. an aqueous paint formulation, under vigorous mixing conditions; however in this case lower concentrations of the polymeric product are required to be effective, e.g. concentrations less than 1 wt. % of total formulation.

The present products provide higher efficacy at lower concentrations coupled with high organic and inorganic salt tolerance and compatibility with hard water as is often required in shampoos, hair conditioners and rinses as well as in skin cleansing agents. The present products also exhibit excellent stability so that formulations containing these thickeners can be stored over extended periods. Other advantages will become apparent from the properties of the crosslinked terpolymers and gel derivatives.

Having thus generally described the invention, reference is now had to the accompanying examples which illustrate preferred embodiments and comparisons with other commercial thickeners. However, the scope of the invention is not limited to illustrating examples and is restricted only by the claims appended hereto.

EXAMPLES 1–12

Aqueous 1% solids solutions of 3–4% decadiene crosslinked, neutralized MVE/MA/LMA terpolymer reported in Table I were heated in a glass beaker to 80° C. for 0.5 hours, after which the solutions were allowed to cool to room temperature. Aqueous 20% $NaC_1$ solution was then added with constant agitation until the salt concentration reached 1% by weight. The initial viscosity (TE spindle 10 rpm) of the crosslinked neutralized terpolymer containing 0% salt was compared with the final viscosity of the crosslinked terpolymer solution containing 1% salt. The results of these experiments are reported in following Table I.

TABLE I

| Ex. | Polymer | Crosslinking Agent (%) | Neutralized with NaOH to pH | Description | Initial Viscosity (K)** | Final Viscosity (K)** | % Viscosity Retained |
|---|---|---|---|---|---|---|---|
| 1 | MVE/MA/LMA* (2.4:1:0.065) | 3% decadiene | 6.78 | gel | 75.5 | 47.0 | 62 |
| 2 | MVE/MA/LMA (2.4:1:0.1) | 4% decadiene | 6.72 | gel | 110.0 | 14 | 5 |
| 3 | MVE/MA/LMA (2.4:1:0.05) | 3% decadiene | 6.71 | gel | 37 | 18 | 49 |
| 4 | MVE/MA/LMA (1.5:1:0.1) | 2% decadiene | 6.96 | gel | 129 | 5 | 4 |
| 5 | MVE/MA/LMA (3:1:0.065) | 3% decadiene | 6.81 | gel | 36.25 | 23.5 | 67 |
| 6 | MVE/MA/LMA (2.5:1:0.065) | 3% decadiene | 6.40 | gel | 76.5 | 56.5 | 74 |
| 7 | MVE/MA/LMA (2.5:1:0.03) | 3% decadiene | 6.79 | gel | 45 | 25 | 56 |
| 8 | MVE/MA/LMA (2.5:1:0.04) | 3% decadiene | 6.91 | gel | 53 | 22 | 47 |
| 9 | MVE/MA/LMA (2:1:0.03) | 3% decadiene | 6.7 | gel | 61 | 21 | 32 |
| 10 | MVE/MA/LMA (2.5:1:0.03) | 3% decadiene | 7.65 | gel | 37 | 24.7 | 67 |
| 11 | MVE/MA/LMA (2.5:1:0.03) | 3% decadiene | 7.01 | gel | 24 | 17.25 | 72 |
| 12 | MVE/MA/LMA (2.5:1:0.03) | 3% decadiene | 7.08 | gel | 64 | 18.5 | 29 |

*methyl vinyl ether/maleic anhydride/lauryl methacrylate
**determined with TE spindle, 10 rpm

EXAMPLES 13–17

The salt tolerance of the commercial thickeners reported in following Table II was determined in a manner similar to Examples 1–12 by employing 1% aqueous solids solutions with gradual addition of aqueous 20% NaCl solution to achieve a salt concentration of 1 wt. %.

TABLE II

| Ex. | Polymer | Crosslinking Agent (%) | Neutralized with NaOH to pH | Description | Initial Viscosity (K)** | Final Viscosity (K)** | % Viscosity Retained |
|---|---|---|---|---|---|---|---|
| 13 | MVE/MA* (1:1) | 2.5% decadiene | 6.25 | liquid | 82.25 | 4.6 | 5.6 |
| 14 | MVE/MA/DD** | 4% decadiene | 7.0 | liquid | 57.3 | 4.2 | 0.1 |
| 15 | MVE/MA/TD*** | 3% decadiene | 8.0 | liquid | 95.0 | 2.7 | 4 |
| 16 | MVE/MA/LMA (1:1:0.05) | not crosslinked | 7.0 | liquid | 1 | <0.1 | — |
| 17 | MVE/MA/acrylic | not | 7.0 | liquid | 1 | <0.1 | — |

TABLE II-continued

| Ex. | Polymer | Crosslinking Agent (%) | Neutralized with NaOH to pH | Description | Initial Viscosity (K)** | Final Viscosity (K)** | % Viscosity Retained |
|---|---|---|---|---|---|---|---|
| | acid (1:1:4) | | | crosslinked | | | |

*STABILEZE-06 supplied by ISP
**methyl vinyl ether/maleic anhydride/1-decene
***methyl vinyl ether/maleic anhydride/14-tetradecene The salt containing compositions in Table II are unsuitable as thickening or emulsifying agents since they fail to meet the minimum viscosity, i.e. 7,000 cps, (7K) required for thickening affects.

What is claimed is:

1. A 1–8% crosslinked terpolymer of $C_1$ to $C_4$ alkyl vinyl ether, maleic anhydride and a $C_{10}$ to $C_{20}$ alkyl acrylate or methacrylate in a mole ratio of 1–3:1:0.01–0.08, said terpolymer having a pH of from about 4 to about 11 and a Brookfield viscosity of from about 10,000 to about 150,000 cps.

2. The composition of a 1 weight % solids gel of the terpolymer of claim 1 and 0–1 weight % salt wherein said terpolymer retains 30–75% of its initial viscosity.

3. The composition of claim 2 wherein said terpolymer gel is a hydrogel.

4. The composition of claim 2 wherein the initial viscosity of said terpolymer is between about 20,000 and about 100,000 cps.

5. The composition of claim 4 wherein the mole ratio of said terpolymer is about 2–2.5:1:0.03–0.07 and said terpolymer is 3–4% crosslinked with a $C_6$ to $C_{14}$ diene.

6. The composition of claim 5 wherein the mole ratio of said terpolymer is about 2–2.5:1:0.03–0.07 and said terpolymer is 3–4% crosslinked with a $C_8$ to $C_{12}$ diene.

7. The composition of claim 2 having a pH of from about 5.5 to 8.

8. The composition of claim 2 wherein said terpolymer gel is a hydrogel and is 3–4% crosslinked.

9. The composition of claim 2 containing a metal halide salt.

* * * * *